United States Patent [19]
Owechko

[11] Patent Number: 4,959,532
[45] Date of Patent: Sep. 25, 1990

[54] OPTICAL NEURAL NETWORK AND METHOD

[75] Inventor: Yuri Owechko, Newbury Park, Calif.

[73] Assignee: Hughes Aircraft Company, Los Angeles, Calif.

[21] Appl. No.: 311,495

[22] Filed: Feb. 16, 1989

[51] Int. Cl.$^5$ .............................................. G01J 1/20
[52] U.S. Cl. ............................... 250/201.9; 350/331 R
[58] Field of Search ...................... 250/201; 350/331 R

[56] References Cited

U.S. PATENT DOCUMENTS

| | | | |
|---|---|---|---|
| 4,728,174 | 3/1988 | Grinberg et al. | 350/331 R |
| 4,765,717 | 8/1988 | Buzak et al. | 350/331 R |
| 4,810,058 | 3/1988 | Sangyoji et al. | 350/331 R |
| 4,812,637 | 3/1989 | Taki | 250/201 |
| 4,817,072 | 3/1989 | Toide et al. | 250/201 |
| 4,837,843 | 6/1989 | Owechko . | |

Primary Examiner—David C. Nelms
Assistant Examiner—Que Tan Le
Attorney, Agent, or Firm—V. D. Duraiswamy; W. K. Denson-Low

[57] ABSTRACT

An optical neural network stores optical transmission weightings as angularly and spatially distributed gratings within a phase conjugate mirror (PCM), the PCM using a stimulated process to generate a phase conjugated return beam without separate external pump mechanisms. An error signal is generated in response to differences between the actual and a desired output optical pattern, and is used to adjust the PCM gratings toward the desired output. One or more intermediate image planes may be employed along with the input and output planes. The input and intermediate planes, as well as the error signal, are preferably displayed on the surface of a spatial light modulator. The output optical signal is transduced into an electrical format for training the neural network; with the error signal also generated electrically. A significant increase in neuron and interconnection capacity is realized, without cross-talk between neurons, compared to prior optical neural networks.

39 Claims, 3 Drawing Sheets

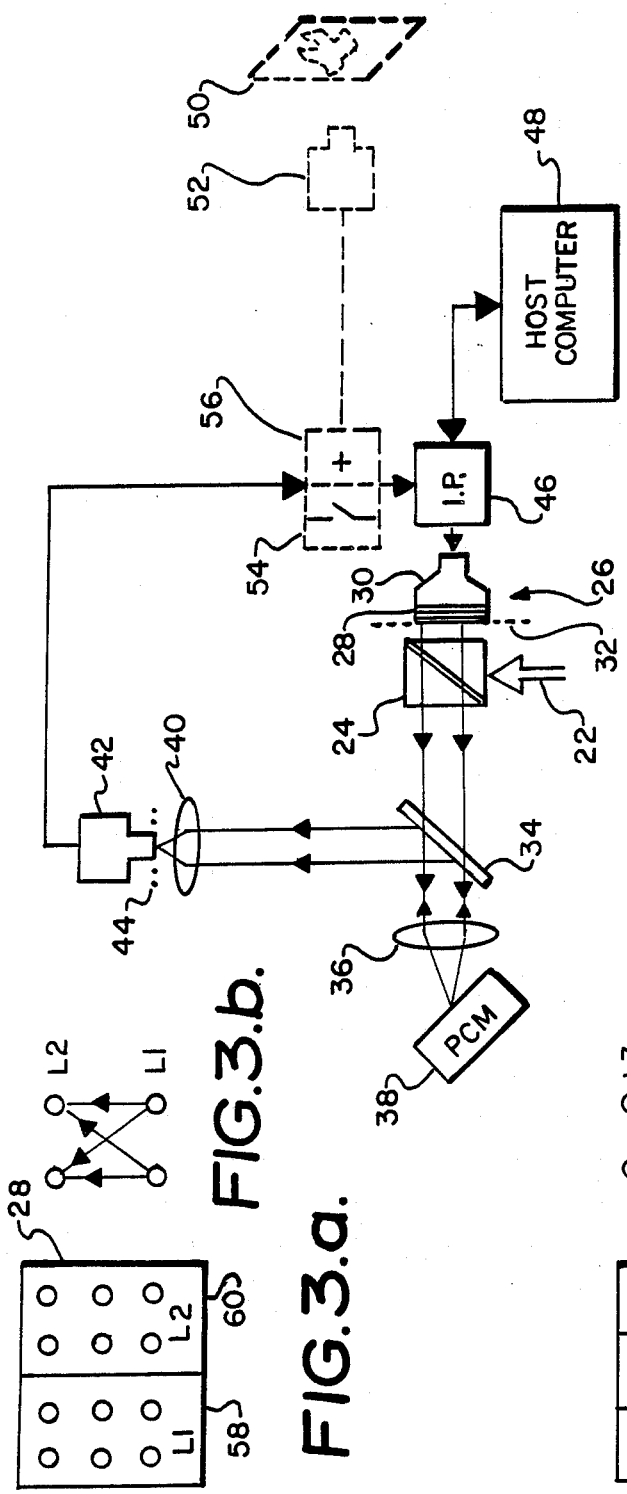

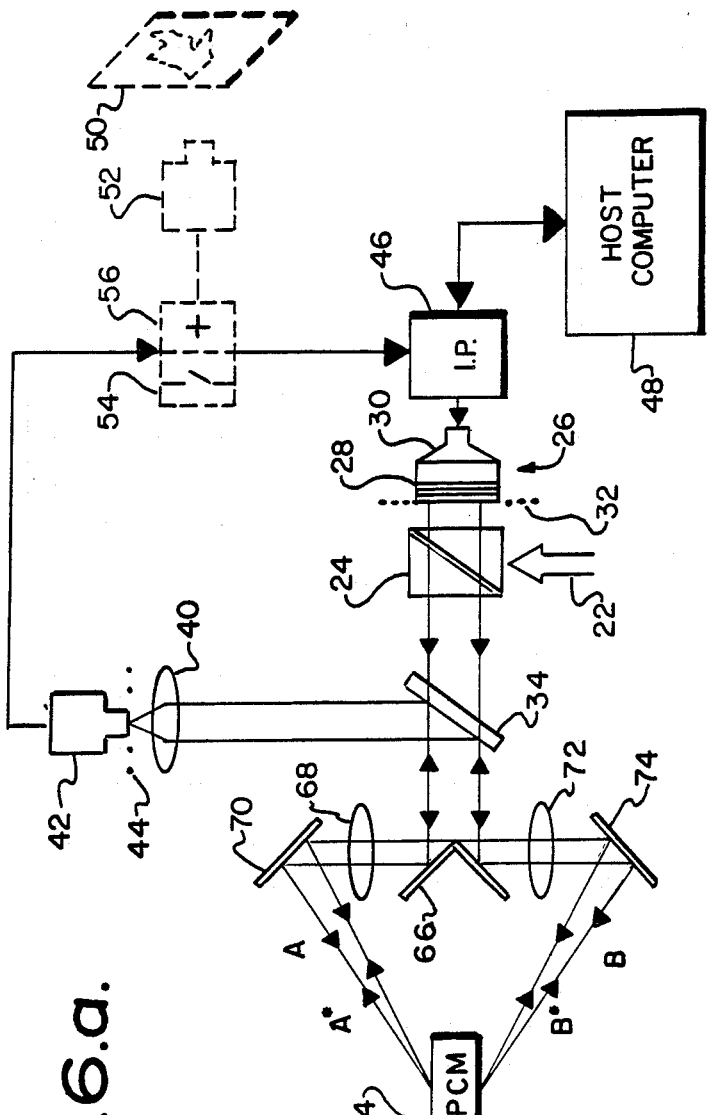
FIG. 5.
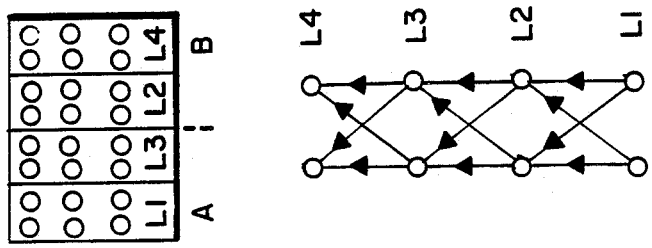
FIG. 6.a.  FIG. 6.b.

OPTICAL NEURAL NETWORK AND METHOD

GOVERNMENT RIGHTS

This invention was made with United States government support under Contract No. F49620-88-C-0063 awarded by the Department of the Air Force. The United States government has certain rights in this invention.

BACKGROUND OF THE INVENTION

1. Field of the Invention

This invention relates to opticalneural networks.

2. Description of the Related Art

A neural network is a computational structure modeled on biological processes. The models are composed of many nonlinear computational elements operating in parallel and arranged in layers analogous to biological neural nets. Computational elements or nodes are connected via weights that are typically adapted during use to improve performance. The output of each neuron may be connected to many other neurons via connection weights and is a nonlinear function of the weighted sum of the outputs of those connected neurons; the nonlinear function is usually called the neuronactivation function. Neural networks have particular potential in areas such as speech and pattern recognition and categorization, compensation of focal plane array nonuniformities and combinationally complex scheduling problems, in which many hypotheses are pursued in parallel, high computation rates are required, and currently available systems do not equal human performance.

Instead of performing a program of instructions sequentially, as in a typical computer, neural networks explore many competing hypotheses simultaneously using massively parallel networks composed of many computational elements connected by links with variable weights. Neural networks can be "taught" to produce desired outputs in response to given inputs by an iterative sequence of adjustments. A general introduction to the subject is provided in Lippmann, "An Introduction to Computing with Neural Nets", IEEE ASSP Magazine, Apr. 1987, pages 4–22.

A neural network is "trained" to produce an appropriate response to a class of inputs by being presented with a sufficient number of examples during the learning phase. The presentation of these examples causes the strength of the connections between the neurons that compose the network to be modified according to the specifics of the learning algorithm. A successful learning procedure results in a trained network that responds correctly when it is presented with the examples it has seen previously, and also with other inputs that are similar to the known patterns.

Many neural network models have been described in the literature for such processing tasks as associative memory, unsupervised pattern categorization, and pattern recognition, as well as others. The models differ in the degree of connectivity and the equations for adjusting the connection weights in response to input patterns ("learning"). Most of the models use some form of "Hebbian" learning in which the incremental change in a weight connecting two neurons is given by the product of the neurons' activation levels.

Investigations have been conducted recently into the implementation of neural networks by optical means. The massive interconnectivity, parallelism and analog nature of optical architectures are good matches to the requirements of neural network models. In a related series of investigations involving associative memories, phase conjugate mirrors (PCMs) were employed in a holographic memory system in which pairs of information patterns were stored in such a way that the introduction of one pattern results in the recall of another. Such associative memories, however, can recognize only specific images, as opposed to a more generalized neural network which can be taught to recognize patterns belonging to a general class, e.g. generalize from examples. The associative memory work is exemplified in Patent Nos. 4,739,496, 4,750,153 and 4,762,397, all assigned to Hughes Aircraft Company, the assignee of the present invention.

Previous optical holographic implementations of neural network models used a single grating in a photorefractive crystal to store a connection weight between two neurons; each pixel in the input/output planes corresponded to a single neuron. An interference was established between two beams to form a sinusoidal grating, which thereafter induced a phase shift in a readout beam via the photorefractive effect. The weighting of the connection between each pair of neurons was encoded in the modulation depth of a single associated grating. Optical holographic approaches are discussed in the following: Psaltis, Yu, Gu and Lee, "Optical Neural Nets Implemented with Volume Holograms", Lake Tahoe Meeting 1987, pages 129–132; Psaltis, Brady and Wagner, "Adaptive Optical Networks Using Photorefractive Crystals", Applied Optics, Vol. 27, No. 9, 1 May 1988, pages 1752–1759; Wagner and Psaltis, "Multi-Layer Optical Learning Networks", Applied Optios, Vol. 26, No. 23, 1 December 1987, pages 5061–5076; Owechko, "Optoelectronic Resonator Neural Networks", Applied Optics, Vol. 26, No. 23, 1 Dec. 1987, pages 5104–5110; and Owechko, Soffer and Dunning, "Optoelectronic Neural Networks Based on Holographically Interconnected Image Processors", SPIE Vol. 882, 1988, pages 143–153.

The latter two articles describe an opto-electronic nonlinear holographic associative memory consisting of a hologram situated in a phase conjugate resonator formed by four-wave mixing. A PCM separate from the hologram storage mechanism provides phase conjugation and optical routing.

The disclosed use of a single grating in a photorefractive phase conjugate crystal to store a connection weight between two neurons relies upon the Bragg condition for angularly selective diffraction from a grating to avoid cross-talk between neurons. However, because of the angular degeneracy of the Bragg condition, neuron isolation is incomplete and cross-talk results which would prevent proper operation of the neural network. To remove the cross-talk, the neurons must be arranged in special patterns in the input/output planes. This results in an under-utilization of the total available output from the spatial light modulators (SLMs) used to present the input image, and incomplete utilization of the SLMs. In particular, if the SLMs are capable of displaying $N \times$ pixels, the disclosed methods can store only $N^{3/2}$ neurons and $N^3$ interconnections. This compares with an optimal storage capacity of $N^2$ neurons and $N^4$ interconnections if the entire capacity of the SLMs were used. Since N is typically in the range of 500–1,000, this under-utilization of the SLM capacity is substantial. Furthermore, the prior holographic systems use a lithium niobate medium to store the holograms, resulting in a bulky system that is difficult to work with.

SUMMARY OF THE INVENTION

The present invention seeks to provide an optical neural network system and method which substantially eliminates cross-talk in the input and output planes, is capable of utilizing the full SLM capacity to provide more interconnections within the network, is programmable, self-aligning and relatively compact, and uses spatial as well as angular selectivity.

These goals are accomplished with a new type of optical neural network and method in which a PCM is used for both phase conjugation and routing, and to store the connection weights between neurons. A particular type of PCM which uses a stimulated process to generate a phase conjugated return beam, without a separate external pump mechanism, forms a continuum of angularly and spatially distributed gratings for this purpose. Selfpumped and mutually pumped PCMs are suitable for this purpose; four-wave mixing PCMs used in prior optical neural networks are not suitable.

The PCM stores optical transmission weightings between the pixels of the input and output patterns as distributed gratings. An optical transmission system directs a pixelized input beam from the input pattern to the PCM, and a conjugate of the input beam is returned from the PCM as a pixelized output optical pattern.

To provide multiple layers for the network, one or more intermediate image patterns may be formed from the conjugate of the object beam returned from the PCM, the intermediate image patterns being returned to the PCM to influence the production of the final output pattern. In a preferred embodiment the input pattern is formed on one portion of the surface of an SLM, and the intermediate patterns are formed on a discrete portion of the SLM surface.

To train the system, a grating adjustment mechanism is provided which responds to differences between the pixelized output optical pattern, and a desired output optical pattern, to present an optical error signal to the PCM. The error signal adjusts the PCM's gratings towards the production of the desired output pattern when its corresponding input pattern is received. The error signal can be presented along with the input pattern and any intermediate image patterns on the surface of an SLM.

The error generation function is preferably implemented electrically. To accomplish this, the output optical pattern is transduced into an electrical output signal, the input optical pattern is presented as an electrical input signal, and the generation of the error signal takes place electronically. The input optical pattern can be obtained either from an electrical image storing mechanism, or from a live optical input image which is transduced into an electrical signal.

These and other features and advantages of the invention will be apparent to those skilled in the art from the following detailed description of preferred embodiments, taken together with the accompanying drawings, in which:

DESCRIPTION OF THE DRAWINGS

FIG. 2 is a block diagram of one optical neural network in accordance with the present invention, including an optional real time input;

FIGS. 3a and 3b are diagrams illustrating the arrangement of optical patterns on an SLM for a two-level network in accordance with the invention;

FIGS. 4a and 4b are diagrams illustrating the arrangement of optical patterns on an SLM for a three-level network, in accordance with the invention;

FIG. 5 is a block diagram of another embodiment of the invention, designed for a four-level optical neural network; and FIGS. 6a and 6b are diagrams illustrating the arrangement of optical patterns on an SLM for the embodiment of FIG. 5.

DETAILED DESCRIPTION OF THE INVENTION

Figure 1B:
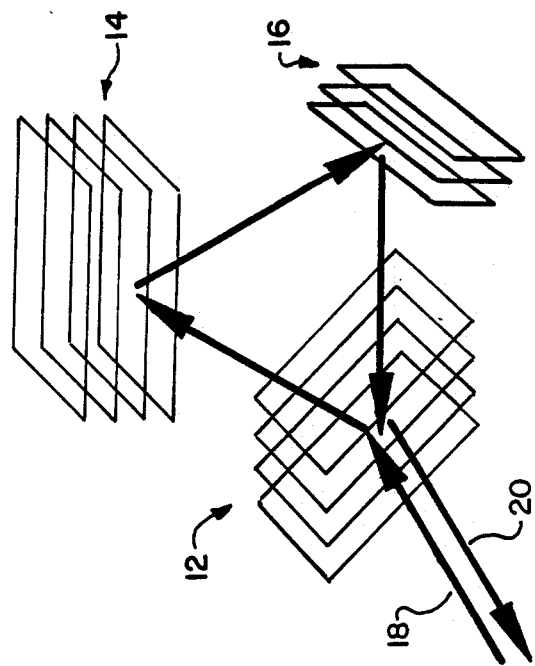
FIG. 1b is a diagram illustrating the operation of a PCM with angularly and spatially distributed gratings used in the present invention.
Figure 1A:
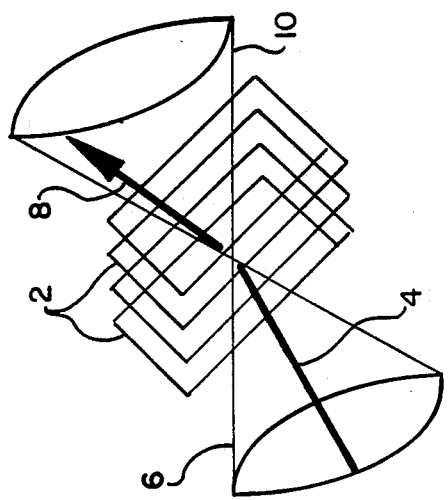
FIG. 1a is a diagram illustrating the operation of single grating PCMs employed with prior optical neural network systems.

FIG. 1a illustrates the prior use of separate hologram gratings to store weighting factors for an optical neural network. The storage device could be any photorefractive crystal, typically lithium niobate. The grating is indicated by parallel planes 2, which are separated by distances equal to the grating period. When a PCM was used in such a holographic neural network, the PCM served as a convenient beam director for directing the beam to read out the hologram. The PCM was separate from the hologram storage mechanism, and served in place of other optical director devices such as mirrors and beam splitters.

One of the problems with this approach was that, once the grating hologram had been written by a writing beam at a particular angle, it could then be read out by any readout beam 4 that struck the grating at any angle along an entire cone of angles 6, so long as the periphery of cone 6 established an absolute angle to the grating equal to the angle of the initial write beam. The direction of the output beam 8 varied according to the direction of the input readout beam 4, and was located along an output cone 10 corresponding to input cone 6. The result was both cross-talk among different pixels within the input beam, and the possibility of producing an output from unintended light that reached the hologram along any part of the input cone 6.

Rather than using a single-grating hologram to store the interconnection weightings and a separate PCM as a beam director, the present invention uses a single PCM that forms a continuum of angularly and spatially distributed gratings to both record the interconnection weightings, and to assist in directing the readout beam. The PCM must be one that uses a stimulated process to generate a phase conjugate return without the use of separate, non-information bearing external pump beams. PCMs based upon separate external pump beams, which were used in prior systems as beam directors, will not work with the present invention. Two types of PCMs that form the desired continuum of angularly and spatially distributed gratings, and therefore can be used with the present invention, are self-pumped and mutually pumped PCMs. Self-pumped PCMs are described in Feinberg, "Photorefractive Nonlinear Optics", Physics Today, October *1988*, pages 46–52, while mutually pumped PCMs are described in S. Weiss, S. Sternklar and B. Fischer, "Double Phase Conjugate Mirror: Analysis, Demonstration and Applications", Optics Letters, Vol. 12, No. 2, February 1987, pages 114–116; and M. D. Ewbank, "Mechanism for Photorefractive Phase Conjugation Using Incoherent Beams", Optics Letters, Vol. 13, No. 1, Jan. 1988, pages 4749.

With a self-pumped PCM, each neuron in the network will be self-connected, as well as connected to other neurons. With a mutually pumped PCM, also referred to as a double PCM, each neuron will be connected only to other neurons. Since a mutually pumped PCM has two input beams, one of which pumps the other, it can support two input images, as opposed to only one for a selfpumped PCM. Mutually pumped PCMs are particularly useful for multiple layer, high capacity neural networks.

Several explanations have been proposed to explain self-pumped phase conjugation in a photorefractive material, such as a $BaTiO_3$ crystal. These include internal four-wave mixing aided by Fresnel reflections, and stimulated photorefractive backscattering. Whatever the actual mechanism may be, each pixel in an input beam writes gratings with and pumps all other pixels (including itself) to form a phase conjugate return beam. This results in a physical system that is massively interconnected and parallel, and which is a favorable medium for implementation of neural network models.

The continuum of angularly and spatially distributed gratings that can be established within a self-pumped PCM is illustrated in FIG. 1b. Three sets of gratings 12, 14 and 16, which may be associated with various faces of the crystal medium, are shown. Such gratings have been found to be established at precise angular and spatial orientations with respect to each other as the result of an input write beam. To read out the gratings (which represents the interconnection weightings of the neural network), a readout beam 18 must strike the crystal at exactly the same angle as the beam which was originally used to write the gratings. At this angle, the readout beam 18 is directed from one grating to the next and then back to the initial grating 12, where it is refracted back out of the crystal as a return conjugate beam 20 along the opposite path to readout beam 18.

If the incident angle of readout beam 18 is changed, its path within the crystal will be shifted so that it can no longer propagate from one pre-established grating to the next, and the gratings will not be read out. Thus, to access the original weighting information contained in the gratings, it is necessary that readout beam 18 strike the crystal at the same angle as the beam originally used to write the gratings. This substantially eliminates the cross-talk between beam pixels associated with the cone of angular ambiguity which characterized the prior holographic approach.

A block diagram of one system that can be used to implement the present invention is shown in FIG. 2. A readout beam 22 is directed by a polarizing beam splitter 24 onto the readout surface of an SLM 26. In the illustrated embodiment, the SLM consists of a liquid crystal light valve 28 addressed by an electrically driven cathode ray tube 30. In general, any SLM which effects an electro-optic conversion could be used. This could include magneto-optic devices, Pockels readout optical memories, deformable mirrors or liquid crystal televisions.

The readout beam 22 acquires an input image pattern from the front face of LCLV 28, which may be considered as an object plane 32. The "object plane" 32 corresponds to the plane of neurons represented by pixels on the LCLV. The pixelized readout beam reflected off LCLV 28 is then processed through beam splitter 34 and lens 36 into a self-pumped PCM 38. If the gratings are first being written in the PCM, 38. If the gratings are first being written in the PCM, an intense beam will be used and left on for a considerable period of time to establish a long-term grating memory which sets the interconnection weightings for the neural network. If the gratings now desired to read them out, a less intense beam will be applied for a shorter period of time. Since the speed of grating formation depends upon the beam intensity, the use of a less intense readout beam for a short period of time will permit the interconnection weightings stored in the PCM gratings to weight the input beam pixels, without substantially erasing or altering the long-term grating memory.

Assuming the readout beam strikes the PCM at the same angle as the beam originally used to write the gratings, the beam will acquire the weighting information and be returned from the PCM as a retroflected beam. After reflecting off beam splitter 34, the beam is focused by lens 40 onto an opto-electronic detector 42, which transduces the optical beam information into an electrical signal. The detector 42 may be implemented by a charge coupled device or Vidicon. Its forward surface which receives the processed readout beam may be considered as an image plane 44 of the neural network system.

If the neural network system has previously been "trained", the output of detector 42 may be considered to be the output of the neural network, and the process is complete. If the network is being "trained", however, further processing takes place. The electrical signal from detector 42 is delivered to an image processor 46, which is linked to a host computer 48. The image processor 46 includes a frame grabber which stores successive video frames from the detector 42 in electronic memory. The computer 48 electronically stores input images which are delivered via image processor 46 to the CRT 30, causing an input pattern to appear on the forward face of LCLV 28.

The host computer also stores a set of desired output images, one for each input image. When an output image is presented electronically from detector 42 to image processor 46, it is compared with the desired output image for the current input pattern, and an error signal representing the difference between the two is generated. The comparison and generation of the error signal can occur either within the computer 48 or the image processor 46; an image processor will generally operate faster than a general purpose computer, since it is capable of accomplishing a frame-by-frame subtraction. A suitable image processor for this purpose is the FG100 frame grabber/image processor by Imaging Technology Corp.

As an alternate to stored input image patterns, a real-time input image 50 can be acquired and converted to an electric signal by a video detector 52, which is similar to detector 42. Elements 50 and 52 are shown in dashed lines to indicate that they are optional.

The optional electrical image signal from detector 52 may be applied to the image processor 46 through a switch 54. This switch is capable of selecting between real-time detector 52 and the host computer for the provision of input images. Alternately, real-time detector 52 may be interconnected into the system via a summing node 56, which combines the electrical representations of the real-time input image and the output image from detector 42 for processing by the image processor/computer to determine differences between the actual and desired output images.

One important aspect of the system just described is that, with a self-pumped or mutually pumped PCM 38, only light directed from the object plane of SLM 26 will be processed through the PCM to reach the image plane 44 of output detector 42. Light from any other direction that reaches the PCM will be retrodirected back to a location other than detector 42.

FIG. 3a shows diagrammatically the readout face of LCLV 28 or other SLM 26 from FIG. 2, and illustrates a training mechanism that may be employed in a simple two-layer optical neural network. Two pixels each from the input layer L1 and the output layer L2 are illustrated in the diagram of FIG. 3b. The vector arrows between the various pixels indicate that each input pixel has an interconnection weighting with each of the output pixels.

The output surface of LCLV 28 is shown divided into two halves, one half 58 displaying the pixelized input image L1, and the other half 60 displaying a pixelized output image which corresponds to the neurons of L2. When the input image is first applied to the LCLV, either from a stored image in computer 48 or a real-time image 50, the input image is displayed on LCLV section 58 and output section 60 is off. The input image is read out and fed through the neural network loop, with the output image from detector 42 processed on a point-by-point basis by image processor 46. An error signal is formed from a point-by-point comparison between the actual output signal and the stored desired output signal, and displayed in LCLV section 60. The displayed error signal modulates a light beam which is applied to the PCM to partially re-write the gratings therein and bring the actual output image closer to the desired output.

The cycle is then repeated for as many additional inputs as desired, until one error correction iteration has been completed for all of the desired input patterns. Additional training iterations are performed until the actual outputs for each of the various input patterns correspond to the desired outputs.

The described training cycle is applicable to various neural network learning systems, such as Perceptron learning (in which the image processor implements a step function threshold), or least means square error learning (in which a sigmoidal threshold function is implemented). Such training techniques are described in the Lippmann publication referenced previously.

The situation for an optical neural network with additional layers is illustrated in FIGS. 4a and 4b. Three layers L1, L2 and L3 are shown, with input layer L1 propagating to intermediate layer L2, which in turn propagates to output layer L3. The input image for L1 is first displayed on section 58 of the LCLV readout surface. After processing once through the network loop, the image seen by output detector 42 is displayed in section 62 of the LCLV readout surface, corresponding to intermediate plane L2. With LI off, the L2 image is then processed through the loop to obtain a final output image. An error signal is generated from this output image and displayed in LCLV section 60. The error image is used to partially correct the PCM gratings, with further iterations of this process adding additional grating corrections. This allows the implementation of the back-propagation learning algorithm for multi-layer neural networks.

It is desirable that a capability be provided to correct the PCM gratings in either a positive or negative fashion, i.e., by either strengthening or partially erasing the gratings, as required. Since the CRT 30 provides only positive signal outputs, such a capability can be provided by shifting the phase characteristics of the LCLV 28 or other electro-optic modulator employed in the system, or by using separate sets of gratings to represent positive and negative weights.

For example, the CRT 30 affects not only the intensity of the LCLV optical output but also its phase. By rotating the LCLV relative to the polarizing beam splitter 24, an operating point can be reached at which two different but positive CRT inputs to the LCLV result in the same LCLV output intensity, but with relative phase shifts of 180°. Since the phase of the gratings written in the PCM follows the phase of the LCLV output, new gratings can be written which either erase or enhance old gratings by switching between the two CRT input levels. In this manner positive or negative error signals can be implemented optically. Alternately, two separate sets of gratings per neuron can be used to represent positive and negative weights. This can be done by using two pixels on the LCLV to represent one neuron. One pixel receives the sum of the positive inputs and the second pixel receives the sum of the negative inputs. The outputs of the two pixels are subtracted and thresholded electronically to form the neuron output.

FIG. 5 shows another embodiment of the invention which is designed for a four-layer optical neural network, including an input plane, an output plane and two intermediate planes. The electrical and electro-optic elements of the system are essentially similar to that of FIG. 2, and are indicated by the same reference numerals. A mutually pumped PCM 64 is employed to process two input images. A right-angle mirror 66 deflects one-half of the readout beam from LCLV 28 upwards through a lens 68 to a mirror 70, and the other half of the beam downwards through another lens 72 to a second mirror 74. Mirrors 70 and 74 reflect their incident beams onto the PCM as beams A and B, respectively. Retroreflected beams A. and B are returned from the PCM and directed by the mirrors into a combined output beam 76 which goes to detector 42.

In the mutually pumped PCM 64, beam A pumps beam B and vice versa, without any substantial cross-coupling within a particular layer. Beam B reads out the gratings associated with the angle of beam B to form A*, while beam A reads out the gratings associated with the angle of beam A to form B*; A* and B* acquire their overall intensities from beams B and A, respectively.

The neural network of FIG. 5 is diagrammed in FIGS. 6a and 6b, in which the four planes are indicated by L1, L2, L3 and L4. The LCLV display 28 is divided into two sections, one for beam A and the other for beam B. Beam A includes the displays for planes L1 and L3, while beam B includes the displays for planes L2 and L4. In operation, L1 is first processed through the system to obtain L2, L2 is processed through the loop to obtain L3, and finally L3 is processed through the loop to obtain L4. The actual L4 is compared with the desired output image stored in host computer 48, and an error signal representing the difference is generated and displayed in L4. The error signal is then transmitted through the system to adjust the gratings toward the desired output. By intermixing the first L1 image with numerous other L1 images within the same class, with successive corrective iterations for each L1 image, the correct PCM gratings will eventually be obtained.

In contrast to prior optically based neural networks, which could store only $N^{3/2}$ neurons and $N^3$ interconnections while avoiding cross-talk, the systems disclosed in the present application can store $N^2$ and $N^4$ interconnections without substantial cross-talk, provided the storage capacity of the PCM is not exceeded. They are believed to be capable of implementing neural networks consisting of up to $10^5$ neurons, with $10^9$-$10$ interconnections. The mapping of neural network models onto the architecture occurs naturally, without the need for multiplexing neurons or dealing with contention, routing and communication bottle-neck problems, as would be required in electronic implementations, thus simplifying the programming of the network.

While several illustrative embodiments of the invention have been shown and described, numerous variations and alternate embodiments are contemplated which can be made without departing from the spirit and scope of the invention, and which will occur to those skilled in the art. Accordingly, it is intended that the present invention not be limited solely to the specifically described illustrative embodiments. Further, it is understood that these variations and alternate embodiments are within the scope of the invention as defined by the appended claims.

I claim:

1. An optical neural network, comprising:
   means for presenting a pixelized input optical pattern,
   means for receiving a pixelized output optical pattern,
   a phase conjugate mirror (PCM) for both phase conjugation and routing and for storing optical transmission weightings between the pixels of the input and output patterns as angularly and spatially distributed gratings within the PCM, and
   optical transmission means directing a pixelized input beam from the input pattern to the PCM and a phase conjugate of the input beam returned from the PCM as said pixelized output optical pattern.

2. The optical neural network of claim 1, further comprising at least one intermediate image pattern means positioned to receive an intermediate image representing the conjugate of the input beam as returned from the PCM, and to transmit a beam representing said intermediate image to the PCM, said PCM responding to said intermediate image beam in producing said pixelized output optical pattern.

3. The optical neural network of claim 2, wherein said input and intermediate image patterns are formed on discrete portions of a surface of a spatial light modulator (SLM), said means for presenting a pixelized input optical pattern comprising said SLM in combination with means for inputting the input optical pattern into said SLM.

4. The optical neural network of claim 1, said means for presenting a pixelized input optical pattern comprising a spatial light modulator (SLM) in combination with image processing means which control the application of an input image to the SLM.

5. The optical neural network of claim 4, said SLM comprising a liquid crystal light valve.

6. The optical neural network of claim 1, said optical transmission means directing the conjugate of an input beam to the output pattern receiving means only for input beams which are incident to the PCM at a unique predetermined angle.

7. The optical neural network of claim 1, said PCM using a stimulated process to generate a phase conjugated return beam without a separate external pump mechanism.

8. The optical neural network of claim 7, said PCM being self pumped.

9. The optical neural network of claim 8, said PCM being mutually pumped.

10. An optical neural network, comprising:
    means for presenting a pixelized input optical pattern,
    means for receiving a pixelized output optical pattern,
    a phase conjugate mirror (PCM) for both phase conjugation and routing and for storing optical transmission weightings between the pixels of the input and output patterns as angularly and spatially distributed gratings within the PCM,
    optical transmission means directing a pixelized input beam from the input pattern to the PCM and a phase conjugate of the input beam returned from the PCM as said pixelized output optical pattern, and
    grating adjustment means responsive to differences between said pixelized output optical pattern and a desired output optical pattern for presenting an optical error signal to the PCM, said error signal adjusting the PCM's gratings towards the production of said desired output pattern from said input beam.

11. The optical neural network of claim 10, further comprising at least one intermediate image pattern means positioned to receive an intermediate image representing the conjugate of the input beam as returned from the PCM, and to transmit a beam representing said intermediate image to the PCM, said PCM responding to said intermediate image beam in producing said pixelized output optical pattern.

12. The optical neural network of claim 11, wherein said input and intermediate image patterns are formed on discrete portions of a surface of a spatial light modulator (SLM), said means for presenting a pixelized input optical pattern comprising said SLM in combination with means for inputting the input optical pattern into said SLM.

13. The optical neural network of claim 10, said means for presenting a pixelized input optical pattern comprising a spatial light modulator (SLM) in combination with image processing means which control the application of an input image to the SLM.

14. The optical neural network of claim 13, said SLM comprising a liquid crystal light valve.

15. The optical neural network of claim 10, said optical transmission means directing the conjugate of an input beam to the output pattern receiving means only for input beams which are incident to the PCM at a unique predetermined angle.

16. The optical neural network of claim 10, wherein said means for presenting a pixelized input optical pattern responds to input electrical signals to present said input optical pattern, and said grating adjustment means includes optoelectronic means for transducing the output optical pattern into an electrical output signal, for presenting the input optical pattern as an electrical input signal, for comparing said electrical input and output signals to produce an electrical error signal, and for presenting said electrical object and error signals as an input electrical control signal to said means for presenting a pixelized input optical pattern.

17. The optical neural network of claim 16, said means for presenting the input optical pattern as an electrical input signal comprising an electrical image storage means, and means for accessing said image storage means.

18. The optical neural network of claim 16, said means for presenting the input optical pattern as an electrical input signal comprising means for transducing an optical pattern into an electrical signal.

19. The optical neural network of claim 10, said PCM using a stimulated process to generate a phase conjugated return beam without a separate external pump mechanism.

20. The optical neural network of claim 19, said PCM being self pumped.

21. The optical neural network of claim 19, said PCM being mutually pumped.

22. An optical neural network, comprising:
a spatial light modulator (SLM),
an output opto-electrical image detector,
a phase conjugate mirror (PCM) for both phase conjugation and routing and for storing optical transmission weightings as angularly and spatially distributed gratings within the PCM,
optical transmission means directing an input beam from the SLM to the PCM and a phase conjugate of the input beam returned from the PCM to said output image detector as an output beam, said optical transmission means diverting light received from directions other than the SLM away from the output image detector,
means for presenting an input image as an electrical input signal, and
an error reduction network including means for electrically storing a desired output image corresponding to said input image, for electrically comparing the desired output image with the actual output image received by said output image detector and generating an electrical error signal representing the difference between the two, and for presenting said error signal to the SLM, said error signal acting through the the SLM and PCM to adjust the output beam towards said desired output image.

23. The optical neural network of claim 22, wherein said error reduction network controls the SLM to display the input image on one portion thereof and an error image on another portion thereof.

24. The optical neural network of claim 23, wherein said error reduction network controls the SLM to display at least one intermediate image derived from the input image on a third portion thereof.

25. The optical neural network of claim 22, said SLM comprising a liquid crystal light valve.

26. The optical neural network of claim 22, said PCM using a stimulated process to generate a phase conjugated return beam without a separate external pump mechanism.

27. The optical neural network of claim 26, said PCM being self pumped.

28. The optical neural network of claim 26, said PCM being mutually pumped.

29. A method of training an optical neural network to produce a desired output optical image in response to an input optical image, comprising:
applying an input beam which includes a representation of said input optical image at a unique angle and direction to a phase conjugate mirror (PCM), said PCM generating angularly and spatially distributed gratings in response to said input beam,
detecting an output beam consisting of the conjugate of said input beam returned from the PCM only for input beams incident upon said PCM at said unique angle and direction,
comparing said detected output beam with a desired output optical image corresponding to said input optical image, and generating an error signal representing the difference therebetween, and
adjusting the input beam with said error signal to reduce the difference between the detected and desired output beams.

30. The method of claim 29, wherein said input beam is adjusted in successive iterations of error signals to progressively reduce said difference between the detected and desired output beams.

31. The method of claim 30, wherein a plurality of input optical image representations are applied in succession during each iteration, and error signals are generated for each input optical image representations corresponding to respective desired output beams during each iteration, the error signals adjusting the distributed gratings within the PCM to adjust the output beams so as to reduce the differences between the detected and desired output beams for each input optical image representation.

32. The method of claim 29, wherein at least one intermediate optical image is formed from said input optical image by said PCM, and said intermediate optical images are employed in combination with the input optical image and error signal to produce said output beam.

33. The method of claim 29, wherein said error signal is combined with said input optical image as a spatially discrete error optical image.

34. The method of claim 33, wherein said input and error optical images are displayed on spatially discrete output portions of a spatial light modulator (SLM), and said input beam is formed by reading out said SLM.

35. The method of claim 29, wherein said detecting and comparing steps are performed electrically.

36. The method of claim 35, wherein said input optical image and error signals are combined electrically and displayed by means of an electro-optic spatial light modulator to form said input beam.

37. A method of training an optical neural network to produce a desired output optical image in response to an input optical image, comprising:
applying an input beam which includes a representation of said input optical image at a unique angle to a phase conjugate mirror (PCM), said PCM generating angularly and spatially distributed gratings in response to said input beam, and
detecting an output beam consisting of the conjugate of said input beam returned from the PCM.

38. The method of claim 37, wherein at least one intermediate optical image is formed from said input optical image by said PCM, and said intermediate optical images are employed in combination with the input optical image to produce said output beam.

39. The method of claim 38, wherein said input and intermediate optical images are displayed on spatially discrete output portions of a spatial light modulator (SLM), and said input beam is formed by reading out said SLM.

* * * * *